1,790,759

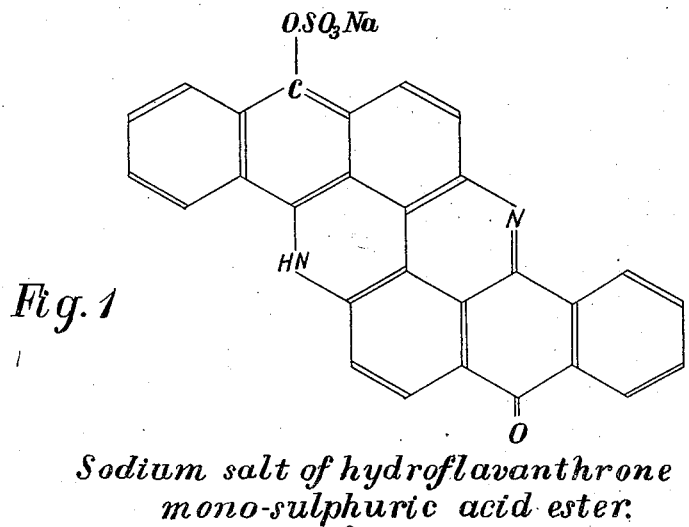
Sodium salt of hydroflavanthrone mono-sulphuric acid ester.
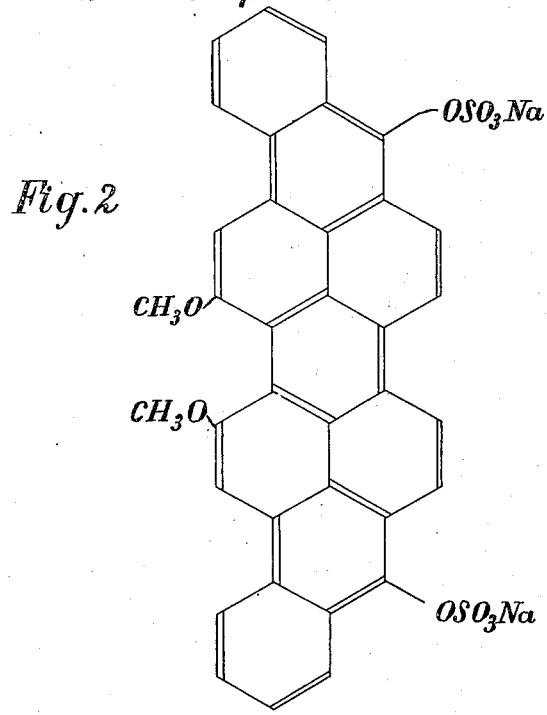
Di-sodium salt of disulphuric acid ester of dihydro-dimethoxy-dibenzanthrone Patented Feb. 3, 1931

UNITED STATES PATENT OFFICE

JAMES MORTON, JAMES IVOR MORGAN JONES, AND BIRKETT WYLAM, OF LANCASTER, AND JOHN EDMUND GUY HARRIS, OF CARLISLE, ENGLAND, ASSIGNORS TO SCOTTISH DYES, LIMITED, OF GRANGEMOUTH, SCOTLAND

DIRECT-DYEING WATER-SOLUBLE STABLE DERIVATIVES OF VAT DYESTUFFS AND PROCESS FOR MAKING SAME

Application filed October 26, 1925, Serial No. 65,036, and in Great Britain November 1, 1924.

This invention relates to the production of dyes and to the art of dyeing including printing.

The object of the invention is to provide dyeing compounds which are in general stable to air, soluble in water and dilute alkali and suitable for the direct dyeing of fabrics by a convenient process.

The invention consists in a process for the production of water-soluble stable derivatives of vat dyestuffs capable of being dyed without the employment of the usual vat process and prepared direct from the parent vat dyestuff according to which this parent dyestuff is suspended in a tertiary base in the presence of a metal and treated by one or other of the following bodies, namely non-alkylated sulphuric acid chloride (chlorsulphonic acid), fuming sulphuric acid, sulphuric anhydride or salts of pyro-sulphuric acid.

The invention also consists in a process for the preparation of a dyeing compound according to which the dry dyestuff together with a metal in a suitable form is suspended in an organic base and the resulting mixture treated with one of the following reagents or a suitable mixture of these reagents, viz. non-alkylated sulphuric acid chloride (chlorsulphonic acid), or its salts, fuming sulphuric acid or sulphuric anhydride or salts of pyro-sulphuric acid, the suspensions of dry dyestuff and metal in the organic base being heated prior to the addition of the reagents if desired and small quantities of bodies which may be, for instance, acids or salts or both being added to the suspension if desired for the purpose of assisting the course of the reaction. It is also advantageous in certain cases to cool the reaction mixture and in others to carry out the reaction at a higher temperature.

The invention also consists in a process for the preparation of a dyeing compound according to which the dry dyestuff together with zinc powder is suspended in pyridine and treated with one or other of the following, viz. non-alkylated sulphuric acid chloride (chlor-sulphonic acid), fuming sulphuric acid or sulphuric anhydride or salts of pyro-sulphuric acid, the dyeing compound being extracted from the resultant mass by the addition of a limited quantity of water and subsequent filtration or other suitable method.

The invention also consists in a dyeing process according to which the solid product resulting from the above process is dissolved in a suitable solvent and the articles to be dyed immersed in the solution, then treated with a bath capable of developing on the article to be dyed the normal colour corresponding to the original dyestuff such, for example, as acid ferric chloride solution, alkaline hypo-chlorite, caustic soda solution and air, perborate solution and permanganate solution.

The invention further consists in processes relating to dyes and to dyeing substantially as herein described and products when prepared by those processes.

Although an explanation of the mechanism of the reactions involved in the examples given in this specification is not of the essence of the invention, the following information explaining the probable reaction is given:—

The basic reaction involved in the process appears to consist of the direct addition of pyridine sulphuric anhydride to the >CO or quinonic groups of the dyestuffs through the agency of the metal.

The functions of the various reagents used are probably as follows:—

The tertiary organic base serves as a diluent and also forms the active esterifying agent, for example, pyridine sulphuric anhydride, by reacting with the particular derivative of sulphuric anhydride used in the melt, for example, chlor-sulphonic acid, oleum, sulphur trioxide, sodium chlor-sulphonate.

The metal apparently behaves as a condensing agent. The acids or acid reacting salts appear to be largely catalytic in their action and small amounts of them may in certain cases assist the reaction to go more smoothly. They are not, however, essential.

Referring to the accompanying diagrammatic drawings, Figure 1 indicates a representation of the possible structural formula of the sodium salt of hydro flavanthrone mono-sulphuric acid ester;

Figure 2 represents a possible structural formula of the disodium salt of disulphuric acid ester of dihydro-dimethoxy-dibenzanthrone.

The following examples illustrate how the invention may be carried into effect with reference to a few dyestuffs and condensing or treating agents, all references to parts in these examples being references to parts by weight and references to degrees being to degrees centigrade:—

Example 1

This deals with Caledon yellow G (flavanthrone) treated in suspension in pyridine in the presence of copper with chlor-sulphonic acid.

13.6 parts of chlor-sulphonic acid are slowly added to 30 parts of dry light pyridine during stirring and cooling. Thereafter an intimate mixture of 5 parts of Caledon yellow G (flavanthrone) and 3 parts of finely divided copper is added and the melt stirred at a temperature of 40° for 20 minutes. The mixture is then cooled and precipitated by adding to 100 parts of water containing 17.6 parts of ammonium hydroxide solution (specific gravity 0.880). The aqueous suspension is then filtered, whereby a dark blue-black product is obtained which is slightly soluble in water but readily so in dilute caustic soda solution. The blue black product is believed to be a co-ordinated metallo-pyridinium derivative of a mono-sulphuric acid ester of di-hydro flavanthrone of the type described elsewhere in this specification. This product is extracted with 500 parts of 1% caustic soda solution at 50° and filtered. The addition of salt to the blue-violet solution causes the precipitation of the dyestuff which is isolated by filtration. The isolated dyestuff apparently consists of the sodium salt of a mono-sulphuric acid ester of dihydro flavanthrone. The structural formula of this appears to be that represented by Figure 1.

Example 2

This deals with Caledon yellow G (flavanthrone), pyridine, zinc and oleum.

14 parts of fuming sulphuric acid containing 65 per cent. of free $SO_3$ are slowly added to 30 parts of dry light pyridine during stirring and cooling. To this melt is added an intimate mixture of 5 parts of Caledon yellow G (flavanthrone) and 3 parts of zinc dust and the mixture stirred in the cold for 15 minutes and then raised to a temperature of 40° C. for a further 15 minutes. The dark blue-black melt is then added to 150 parts of cold water and filtered, whereby a dark blue-black product is obtained. This is extracted with 500 parts of a 1 per cent. caustic soda solution at a temperature of 40° and the extract filtered, whereby a bright blue-violet solution is obtained. This solution dyes animal and vegetable fibres blue-violet shades which may be developed to yellow by immersion in a bath containing an acid oxidizing agent. The blue-black primary product and the product of alkaline extraction appeared to be similar respectively to those obtained in Example 1.

Example 3

This deals with Caledon blue R (indanthrone), pyridine and zinc, the condensing agent being oleum in the presence of stannous chloride.

6 parts of fuming sulphuric acid containing 65 per cent. free $SO_3$ are added to 30 parts of dry light pyridine during stirring and cooling, when an intimate mixture of 3 parts of Caledon blue R (indanthrone), 3 parts of powdered stannous chloride and 3 parts of zinc dust is introduced. A further 8 parts of fuming sulphuric acid are then added and the mixture stirred at room temperature for 30 minutes and then raised to 80° C. for 30 minutes. After cooling the melt is added to 150 parts of cold water and filtered. The violet residue is extracted at the boil with 500 parts of water containing 50 parts of light pyridine and filtered. The pyridine is removed by distillation in steam and the bright violet solution cooled. The addition of salt causes the precipitation of the dyestuff which is isolated by filtration. The product is red-violet in colour and is readily soluble in water, from which solution material may be dyed red-violet shades which are developed to blue on treatment in a bath containing an acid oxidizing agent. Products of this reaction appear to be analogous to those of Examples 1 and 2 that is to say, there is apparently a co-ordinated metallo-pyridinium derivative of a sulphuric acid ester of dihydro indanthrone formed which is partly converted to a sodium salt by extraction with alkali.

Example 4

This deals with Caledon yellow G (flavanthrone), pyridine, copper and sodium pyrosulphate.

A mixture of 3 parts of Caledon yellow G (flavanthrone), 3 parts of finely divided copper and 12 parts of sodium pyro-sulphate is added to 30 parts dry light pyridine and the mixture stirred and heated to a temperature of 70° for 15 minutes. After cooling the melt is added to 150 parts of cold water and filtered, whereby a dark bluish-black product is obtained which is then extracted with 500 parts of 1 per cent. caustic soda solution at a temperature of 40°. Filtration of this extract yields a bright blue-violet solution. This solution dyes animal and vegetable fibres blue-violet shades which may be developed to yellow by immersion in a bath containing an acid oxidizing agent. The primary product and the product of alkaline extraction appear to be similar respectively to those obtained by the method of Example 1.

Example 5

This deals with Caledon yellow G (flavanthrone), pyridine, copper and potassium chlor-sulphonate.

9 parts of powdered potassium chlor-sulphonate are added to 30 parts of dry light pyridine during stirring and cooling. After this addition an intimate mixture of 5 parts of Caledon yellow G (flavanthrone) and 3 parts of finely divided copper is introduced and the mixture raised to a temperature of 80° for 15 minutes. After cooling the melt is poured into 100 parts of water and filtered. The blue-black product remaining from this filtration is extracted with 500 parts of a 1 per cent. caustic soda solution at a temperature of 40° C. and filtered, whereby a bright blue-violet solution is obtained suitable for dyeing cotton or wool and the like in the usual manner. The primary product and the product of alkaline extraction appear to be similar respectively to those obtained by the method of Example 1.

Example 6

This deals with Caledon jade green (dimethoxy-dibenzanthrone), pyridine, zinc and potassium chlor-sulphonate.

8 parts of powdered potassium chlor-sulphonate are added to 20 parts of dry light pyridine during stirring and cooling. A mixture of 3 parts of Caledon jade green (dimethoxy-dibenzanthrone) and 2 parts of zinc dust is added and the melt stirred at room temperature for 1 hour. The purple melt is then poured into 200 parts of cold water and filtered. The residue appears to be mainly a co-ordinated metallo-pyridinium derivative of the di-sulphuric acid ester of dihydro dimethoxy dibenzanthrone. The residue is extracted with 1000 parts of 4 per cent. sodium carbonate solution at 60° and filtered. The addition of salt to the cooled filtrate causes the precipitation of a reddish-brown product. This product is apparently a disodium salt of the disulphuric acid ester of dihydro dimethoxy-dibenzanthrone. The product is readily soluble in water and dyes cotton, wool or silk salmon pink shades which may be developed to green by treatment in a bath containing an acid oxidizing agent.

The structural formula of the end product, namely, the disodium salt of disulphuric acid ester of dihydro-dimethoxy-dibenzanthrone appears to be that represented by Figure 2.

Example 7

This deals with Caledon yellow G (flavanthrone), pyridine, copper and sulphur trioxide.

8 parts of sulphur trioxide are slowly added to 30 parts of dry light pyridine during stirring and cooling. Thereafter a mixture of 5 parts of Caledon yellow G (flavanthrone) and 3 parts of finely divided copper is introduced and the melt heated to a temperature of 80° for 15 minutes. After cooling the mixture is poured into 100 parts of water containing 9 parts of ammonium hydroxide solution (specific gravity 0.880) and filtered. The residue which is apparently a co-ordinated metallo-pyridinium derivative of a disulphuric acid ester of dihydro flavanthrone is extracted with 500 parts of a 1 per cent. caustic soda solution at a temperature of 60° and filtered. To the cooled filtrate salt is added which causes precipitation of a brownish-red product apparently a disodium salt of a disulphuric acid ester of dihydro flavanthrone which is soluble in water and dyes cotton, wool or silk brownish-red shades which may be developed to yellow by immersion in a bath containing an acid oxidizing agent.

Example 8

This deals with Caledon blue R (indanthrone), pyridine and zinc, the condensing agent being potassium chlor-sulphonate in the presence of stannous chloride.

An intimate mixture of 3 parts of Caledon blue R (indanthrone), 3 parts of powdered stannous chloride, 2 parts of zinc dust and 10 parts of powdered potassium chlor-sulphonate is added to 20 parts of dry light pyridine and the mixture heated to 80° for 1 hour. Thereafter the melt is poured into 200 parts of cold water and filtered, whereby a violet product is obtained which is extracted at the boil with 800 parts of water containing 80 parts of light pyridine and filtered. The pyridine is removed by distillation in steam and the bright red-violet solution cooled. The addition of salt causes the precipitation of a red-violet product which is soluble in water and dyes wool and silk red-violet shades which may be developed to blue by treatment with an acid oxidizing agent. Products of this reaction appear to be analogous to those of Examples 1 and 2 that is to say, there is apparently a coordinated metallo-pyridinium derivative of a sulphuric acid ester of dihydro indanthrone formed which is partly converted to a sodium salt by extraction with alkali.

Example 9

This deals with Caledon blue R (indanthrone), pyridine and zinc, the condensing agent being chlor-sulphonic acid in the presence of stannous chloride.

3 parts of Caledon blue R powder (indanthrone) are intimately mixed with 3 parts of stannous chloride and 2 parts of zinc dust and the mixture added to 30 parts of dry light pyridine. 10.2 parts of chlor-sulphonic acid are then added and the mixture stirred at room temperature for 1½ hours when the temperature is raised to 80° for ½-hour. The melt is then poured into 100 parts of cold water and filtered. The product is extracted from the crude residue after filtration by one of the methods already described. It is a red-violet solid, soluble in water and dyes wool and silk red-violet shades which may be developed to blue by immersion in a bath containing an acid oxidizing agent. Products of this reaction appear to be analogous to those of Examples 1 and 2 that is to say, there is apparently a co-ordinated metallo-pyridinium derivative of a sulphuric acid ester of dihydro indanthrone formed which is partly converted to a sodium salt by extraction with alkali.

Example 10

This deals with Caledon blue R (indanthrone), pyridine, magnesium and chlor-sulphonic acid in the presence of stannous chloride.

3 parts of Caledon blue R powder (indanthrone) are intimately mixed with 2 parts of stannous chloride and 0.5 part of powdered magnesium and the mixture added to 30 parts of dry light pyridine. Thereafter 10.2 parts of chlor-sulphonic acid are added and the mixture stirred at room temperature for 2 hours. The melt is poured into 100 parts of water and filtered. The product is extracted from the crude paste by one of the methods already described. It is a red-violet solid, soluble in water and dyes wool or silk red-violet shades which may be developed to blue by treatment with an acid oxidizing agent. Products of this reaction appear to be analogous to those of Examples 1 and 2 that is to say, there is apparently a co-ordinated metallo-pyridinium derivative of a sulphuric acid ester of dihydro indanthrone formed which is partly converted to a sodium salt by extraction with alkali.

Example 11

This deals with Caledon yellow G (flavanthrone), dimethyl-aniline, copper and chlor-sulphonic acid.

13.8 parts of chlor-sulphonic acid are added to 14 parts of dimethyl-aniline during stirring and cooling. Thereafter an intimate mixture of 5 parts of Caledon yellow G (flavanthrone) and 3 parts of finely divided copper is added and the melt heated to a temperature of 80° C. for 30 minutes. The melt is then added to 200 parts of cold water and filtered. The dark blue-black residue is extracted with 700 parts of 1 per cent. caustic soda solution at 40° C. A brilliant blue-violet solution is obtained which dyes cotton, wool or silk blue-violet shades which may be developed to yellow by treating the dyed material in a bath containing an acid oxidizing agent. Products of this reaction appear to be analogous to those of Examples 1 and 2 that is to say, there is apparently a co-ordinated metallo-pyridinium derivative of a sulphuric acid ester of dihydro indanthrone formed which is partly converted to a sodium salt by extraction with alkali.

Example 12

This deals with Caledon red BN (anthraquinone-1:2-naphthacridone), pyridine, zinc and oleum.

1 part of pure dry Caledon red BN (or anthraquinone-1:2-naphthacridone) is suspended in 8 parts of pyridine and 2 parts of zinc dust added. To the well-stirred mixture are added 4.8 parts of fuming sulphuric acid containing 65 per cent. of free sulphuric anhydride. The addition is carried out at such a rate that the temperature does not exceed 60° C. The reaction mixture may be cooled by external means, in which case the addition may be more rapid. When the whole of the fuming sulphuric acid has been added 24 parts of a solution of caustic soda containing 4.8 parts of caustic soda are added. The resulting mixture is then distilled in vacuo, whereby the pyridine is recovered in the form of an aqueous solution. The stable product remains behind as a yellow mass which is washed with cold water to remove any soluble impurities. The yellow stable product remaining which is apparently a co-ordinated metallo-pyridinium derivative of a sulphuric acid ester of dihydro-anthraquinone-1:2-naphthacridone may be dissolved in hot water, with or without the addition of acid or alkali, and the resulting solution used for dyeing cotton, wool, natural or artificial silk or other animal or vegetable fibres. The colour may be developed on the fibre by treatment with mild acid oxidizing agents, such as acid ferric chloride solution. The product extracted from the above-mentioned co-ordinated metallo-pyridinium derivative by means of alkali appears to be an alkali salt of a sulphuric acid ester of dihydro-anthraquinone-1:2-naphthacridone.

Example 13

This deals with Caledon blue R (indanthrone), pyridine, zinc and chlor-sulphonic acid in the presence of stannous chloride.

1 part of pure dry Caledon blue R powder (N-dihydro-1:2:1':2'-anthraquinoneazine) is mixed with 1 part of zinc dust and 1 part stannous chloride and suspended in 12 parts of dry pyridine. To the well-stirred mixture are added 3.2 parts of non-alkylated sulphuric acid chloride (chlor-sulphonic acid). The addition is carried out at a temperature of about 100° C. If desired the reaction mixture may be cooled by external means, in which case the addition may be more rapid. When the whole of the non-alkylated sulphuric acid chloride (chlor-sulphonic acid) has been added, 17 parts of a solution of caustic soda containing 3.5 parts of caustic soda are added. The resulting mixture is then distilled in vacuo, whereby the pyridine is recovered in the form of an aqueous solution. The stable product remains behind as a dark red-violet mass which is washed with water to remove any soluble impurities. The dark red-violet stable product remaining is apparently a co-ordinated metallo-pyridinium derivative of a sulphuric acid ester of dihydro-indanthrone, and may be dissolved in hot water with or without the addition of acid or alkali and the resulting solution used for dyeing cotton, wool, natural or artificial silk or other animal or vegetable fibres. The colour may be developed on the fibre by treatment with a 0.5 per cent. solution of sodium nitrite, followed by immersion in an an acid bath.

Example 14

This deals with Caledon Jade Green (dimethoxy-dibenzanthrone), pyridine, zinc and chlor-sulphonic acid.

10 parts of dimethoxy-dibenzanthrone together with 10 parts of zinc dust are suspended in 50 parts of pyridine. The vessel containing the mixture, which is well stirred, is surrounded by crushed ice, so that the contents are cooled to 0° to 5° C. 27 parts of non-alkylated sulphuric acid chloride (chlor-sulphonic acid) are then run into the vessel at such a rate that the temperature of the cooled mixture does not exceed 5° C. When all the acid has been added the melt is distilled in vacuo, whereby a portion of the pyridine is recovered in the dry state. The residue is mixed with 300 parts of cold water and filtered, whereby the solid dyestuff is separated. This residue appears to be a co-ordinated metallo-pyridinium derivative of the disulphuric acid ester of dihydro dimethoxy dibenzanthrone. From the filtrates pyridine can be recovered in known ways. The product dyes cotton, wool and the like reddish-pink shades which on developing with an oxidizing solution give brilliant green shades.

General

Products prepared as described above may be used for printing, for instance as follows as described in British Patent No. 16,805 of 1924:—

3 parts of the dry dyestuff derivative are made to a thin paste with 27 parts of a 5% caustic soda solution (or equivalent parts of a dyestuff paste may be added to a stronger soda solution) and then well mixed with 70 parts of a thickening mixture containing 1 part of British gum and 1 part of water. The resulting paste is printed on textile materials in the usual manner, dried, steamed in a Mather & Platt or other steamer and then treated in a bath of acid ferric chloride or other oxidizing agent in known manner.

The Mather & Platt steamer to which reference has been made is the well-known machine used for ageing, that is to say, steaming printed and other textile fabrics.

Among the dyestuffs which may be employed according to this invention specific reference is made to:—

Indigoid dyestuffs, including indigo and dichlor-and dibrom-indigo;

Anthraquinone dyestuffs, including benzanthrone, indanthrone, flavanthrone and anthraquinone acridone dyestuffs.

In general among the substances which may be dyed or printed effectively by the above process may be noted cotton, wool, natural and artificial silk and other animal or vegetable fibres.

Although they are convenient bodies, as the examples show, the invention is not limited to the use of zinc dust and pyridine; any suitable metal, such as copper for instance, may be used and any suitable substance besides pyridine, for instance, quinoline or dimethyl-aniline or a homologue or substitution product of this type of base.

The formula for the thioindigo body is:

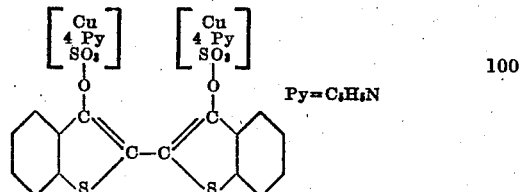

In the case of indigo the formula of the complex is represented by:

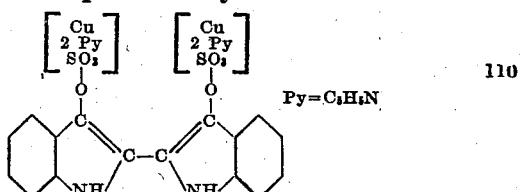

Having now described our invention, what we claim as new and desire to secure by Letters Patent is:—

1. The process of preparing water soluble stable derivatives of vat dyestuffs which comprises treating a vat dyestuff with a reagent selected from the following, chlor-sulphonic acid, salts of chlor-sulphonic acid, fuming sulphuric acid, sulphuric anhydride, salts of pyro-sulphuric acid, the reaction being carried out in the presence of a tertiary organic base and a metal selected from the following, copper, zinc.

2. The process as in claim 1, in which the vat dyestuff used is selected from one of the following dyestuff groups, flavanthrone, indanthrone, dibenzanthrone, benzanthrone, anthraquinone, indigo, halogenated indigo.

3. The process as in claim 1, in which small quantities of stannous chloride are added to the reaction mixture.

4. The process as in claim 1, in which the metal used is zinc dust.

5. As new products, vat dyestuff derivatives such as may be prepared by the process of claim 1, which derivatives are water soluble stable derivatives of vat dyestuffs capable of being used without the employment of the usual vat process, capable of dyeing cotton, wool, natural and artificial silk from water solution, said dyed products being developable to the color of the original dyestuff on treatment with ferric chloride solution, alkaline hypo-chlorite, perborate solution and permanganate solution.

In testimony whereof we have signed our names to this specification.

JAMES MORTON.
JAMES IVOR MORGAN JONES.
BIRKETT WYLAM.
JOHN EDMUND GUY HARRIS.